W. A. HALL, Sr.
POTATO PLANTING MACHINE.
APPLICATION FILED AUG. 13, 1908.
940,147.
Patented Nov. 16, 1909.
2 SHEETS—SHEET 2.
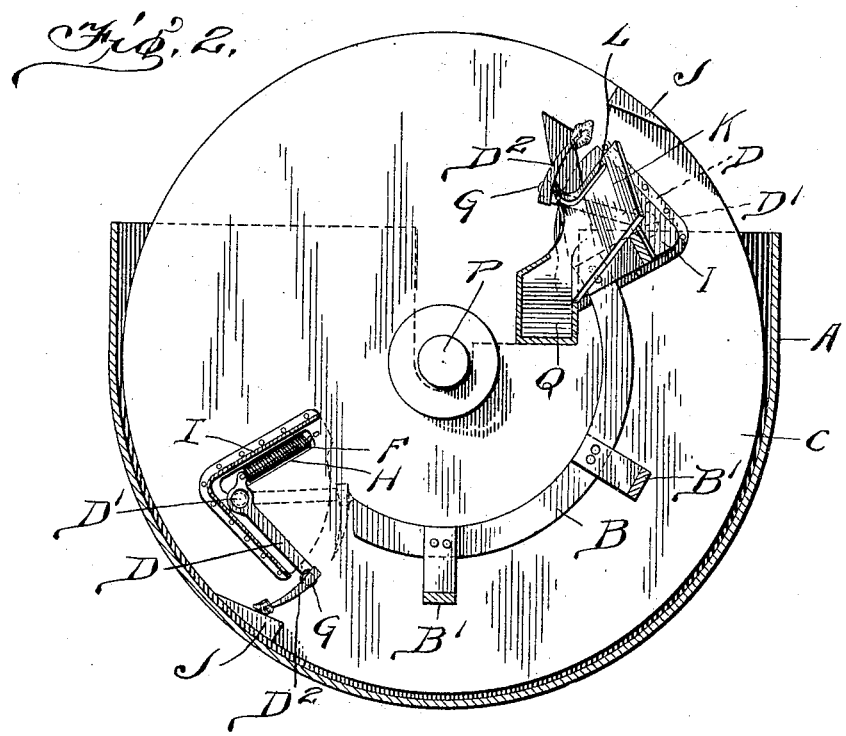
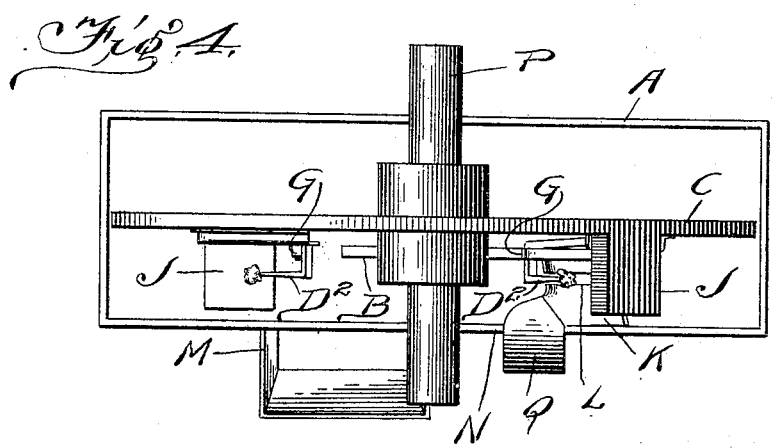

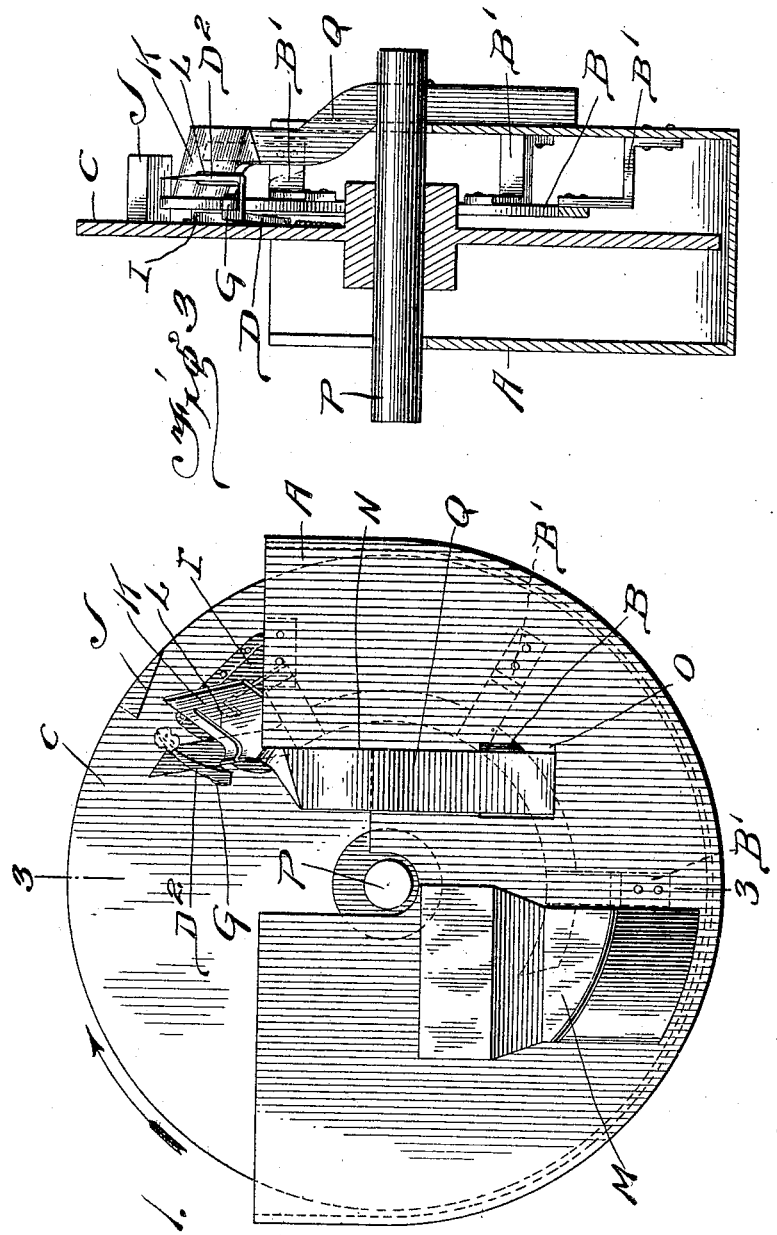

UNITED STATES PATENT OFFICE.

WILLIAM A. HALL, SR., OF PARDEEVILLE, WISCONSIN.

POTATO-PLANTING MACHINE.

940,147.  Specification of Letters Patent.  Patented Nov. 16, 1909.

Application filed August 13, 1908. Serial No. 448,410.

*To all whom it may concern:*

Be it known that I, WILLIAM A. HALL, Sr., a citizen of the United States, residing at Pardeeville, in the county of Columbia and State of Wisconsin, have invented certain new and useful Improvements in Potato-Planting Machines, of which the following is a specification.

This invention relates to droppers for potato planting machines, and is applicable to machines of various kinds, but is especially adapted for use in connection with the potato planting machine shown in my pending application, filed March 28, 1907, No. 365,117. When used on the machine, the device will be arranged to drop two or more rows at the same time, but as herein shown and described it will drop one row only. For dropping other rows the device will be duplicated, except that for two rows the parts will be made "rights" and "lefts".

In the accompanying drawings, Figure 1 is a side elevation of the dropping devices. Fig. 2 is a side elevation of the disk with the trough in section. Fig. 3 is a vertical section on the line 3—3 of Fig. 1. Fig. 4 is a top plan view.

Referring specifically to the drawings, A is a stationary trough into which the potatoes are fed through a hopper M which opens into the trough through one side thereof, near the bottom.

B is a stationary cam located within the trough and supported by brackets B' fastened to the side of the trough.

C is a disk mounted upon a shaft P and arranged to revolve inside of the trough with its lower edge in proximity to the bottom of the trough. The disk revolves on a horizontal axis and therefore travels vertically. It carries one or more potato pickers consisting of levers D pivoted at D' to the side of the disk, and near the outer edge thereof. At its outer end each lever is provided with a picker point $D^2$ which is offset laterally from the end of the lever. The point is presented outwardly or toward the periphery of the disk. The lever is actuated by a spring F which is located in a slot H cut in the disk C, and at its free end the lever has a roller G which is properly located to travel upon the cam B as the disk revolves. A shield I is attached to the side of the disk in advance of the picker lever and serves to protect the same from contact with the potatoes in the trough, and the outer edge of said shield forms a stop to limit the movement or swing outwardly of the picker lever when the roller runs off the end of the cam B. The disk C has laterally projecting shovels or lifters J fastened to the side thereof at the outer edge, opposite to the pickers. The front edge of each shovel travels close to the bottom of the trough and the shovel serves to lift and support a potato or piece thereof in position to be impaled by the picker at the proper time.

K is an apron fastened to the side of the trough A near the top thereof. This is provided with a slot L through which the picker points pass to relieve them of the potato. The apron K is shaped or inclined to cause the potatoes when released from the picker points to roll away from the disk C and into a chute Q which delivers through an opening N in the side of the trough to suitable delivery devices which form no part of this invention and need not be described here, but which are described in my pending application above referred to.

O is an opening in the side of the trough which is unimportant to the present invention, but which is used in connection with the delivery devices referred to in the said application.

In operation, the disk C revolves in the direction of the arrow, carrying with it the pickers and the shovels J. When a picker reaches the upper end of the cam B the roller G rides down said cam and withdraws the point of the picker from the shovel J and through the slot L in the apron K, thereby releasing the potato impaled upon the picker point, and permitting such potato to drop into the chute Q. When the roller G reaches the lower end of and runs off the cam B the picker lever actuated by the spring F, is snapped down and the point impales a potato supported on the shovel J and holds it impressed against said shovel until the roller G again starts to ride on the cam B.

As many picker levers as desired may be attached to the disk C, and the operation of all will be the same.

I claim:

1. The combination of a trough, a disk which revolves therein, a picker carried by the disk and having a point projecting toward the rim of the disk and movable outwardly toward the bottom of the trough to impale a potato therein, an apron located beside the disk and having a slot through which the picker point passes and means to retract the picker point as it passes through the slot.

2. The combination of a trough, a disk revoluble therein, a spring actuated picker lever pivoted to one side of the disk and having at one end a point projecting toward the rim of the disk, a shovel projecting laterally from the same side of the disk at the rim thereof and opposite to the picker point and moving in proximity to the bottom of the trough to lift a potato therein into position to be impaled by the point, and means to retract the point and dislodge the potato therefrom at another position during the revolution of the disk.

3. The combination of a trough, a disk revoluble therein, a spring actuated picker lever pivoted to the side of the disk and having at one end a picker point offset laterally therefrom and projecting radially toward the rim of the disk, the lever vibrating in a plane parallel to the side of the disk to advance or retract the point, means carried by the disk opposite to the point to support a potato or the like, a cam fixed beside the disk in the trough and in the path of the lever and shaped to retract said lever and point against the tension of the spring, said cam terminating at a point near the bottom of the trough, whereby the lever will run off the cam and be advanced by the spring to impale a potato in the trough, and means beside the upper part of the disk to dislodge the potato from the point.

WILLIAM A. HALL, Sr.

Witnesses:
W. I. SPICER,
JESSE STEWART.